United States Patent [19]

Murayama

[11] Patent Number: 5,914,220
[45] Date of Patent: Jun. 22, 1999

[54] POLYESTER SUPPORT, PROCESS FOR MANUFACTURING THE SAME, AND PHOTOGRAPHIC FILM USING THE SAME

[75] Inventor: Masahiko Murayama, Kanagawa, Japan

[73] Assignee: Fuji Photo Film Co., Ltd., Ashigara, Japan

[21] Appl. No.: 08/858,368

[22] Filed: May 19, 1997

[30] Foreign Application Priority Data

May 20, 1996 [JP] Japan ................................. 8-125070

[51] Int. Cl.$^6$ ........................... G03C 1/765; B32B 27/06; B32B 27/36; B28B 11/16
[52] U.S. Cl. ........................... 430/349; 430/496; 430/501; 430/533; 264/146; 264/167; 264/290.2; 264/288.8; 428/480
[58] Field of Search ..................... 430/533, 349, 430/501, 496; 428/480; 264/146, 167, 290.2, 288.8

[56] References Cited

U.S. PATENT DOCUMENTS

| | | | |
|---|---|---|---|
| 4,141,735 | 2/1979 | Schrader et al. | 96/75 |
| 4,677,188 | 6/1987 | Utsumi et al. | 528/748 |

FOREIGN PATENT DOCUMENTS

| | | |
|---|---|---|
| 423630 | 4/1991 | European Pat. Off. . |
| 6-123937 | 5/1994 | Japan . |

*Primary Examiner*—Richard L. Schilling
*Attorney, Agent, or Firm*—Burns, Doane, Swecker & Mathis, LLP

[57] ABSTRACT

A polyester support in which a difference between orientation angles in both the side edges and that in the center thereof is from 0° to 40°, whereby a photographic film having excellent flatness after heat treatment is provided.

18 Claims, No Drawings

POLYESTER SUPPORT, PROCESS FOR MANUFACTURING THE SAME, AND PHOTOGRAPHIC FILM USING THE SAME

FIELD OF THE INVENTION

The present invention relates to a process for manufacturing a silver halide photographic film having excellent flatness after heat treatment, and to the silver halide photographic film.

BACKGROUND OF THE INVENTION

U.S. Pat. No. 4,141,735 discloses that heat treatment of a polyester film at a temperature of from 50° C. to its glass transition temperature (hereinafter occasionally abbreviated as "Tg") tends to prevent the film from generating core-set curl. However, when such a procedure is applied to the formation of the film on an industrial scale (that is, 50 cm or more in width and 500 m or more in length), tightly cinching (force to tighten a roll toward the central axis of the roll) occurs due to heat shrinkage of the film, which is generated during the heat treatment, resulting in deteriorating flatness of the film. This has been an extremely serious problem for photographic photosensitive films (hereinafter occasionally abbreviated as "photographic materials", "photographic films" or "photosensitive films") which are required to have high flatness.

For solving the above described problem, a method of adjusting a creak value between the outer surface and the inner surface of the film to within 10 to 400 g is known, as described in JP-A-6-123937 (The term "JP-A" as used herein means an "unexamined published Japanese patent application"). Although this method is sufficiently effective for the film 100 meters or more apart from a winding core in terms of the film length, it is still insufficient for the film closer to the core, that is, less than 100 meters apart from the core in terms of the film length, resulting in a flatness defect. This is attributable to the fact that the stress due to the tightly cinching produced becomes strongest in the proximate portion to the core, eventually leading to a winding distortion defect (a defect of generating twist wrinkles on the film in the width direction like wrung cloth). As a result, this method is disadvantageous in that it cannot sufficiently raise the yield after heat treatment.

SUMMARY OF THE INVENTION

An object of the present invention is to provide a process for manufacturing a photographic photosensitive material having excellent flatness after heat treatment.

Another object of the present invention is to provide the photographic photosensitive material.

Other objects and effects of the present invention will be apparent from the following description.

The object of the present invention has been achieved by providing:

(1) a polyester support having side edge portions and a center portion, wherein the difference between the orientation angle in the side edge portions and that in the center portion is from 0° to 40°.

(2) a process for manufacturing a polyester support comprising the steps of:
   forming a polyester film; and
   slitting the formed polyester film in the lengthwise direction thereof into 2 to 30 strips, to thereby provide polyester supports each having side edge portions and a center portion, wherein the difference between the orientation angle in the side edge portions and that in the center portion is from 0° to 40°;

(3) a silver halide photographic film which comprises a polyester support having coated, on at least one side thereof, at least one silver halide photographic photosensitive layer,
   wherein the polyester support has side edge portions and a center portion, wherein the difference between the orientation angle in the side edge portions and that in the center portion is from 0° to 40°; and (4) a process for manufacturing a silver halide photographic film, which comprises the steps of:
   providing a polyester support;
   heat-treating the polyester support at a temperature of from 50° C. to the glass transition temperature (Tg) of the support; and
   coating a silver halide photographic photosensitive layer on the heat-treated polyester support,
   wherein the polyester support has side edge portions and a center portion, wherein the difference between the orientation angle in the side edge portions and that in the center portion is from 0° to 40°.

DETAILED DESCRIPTION OF THE INVENTION

When heat treatment is carried out at temperatures from 50° C. to Tg (i.e., Below Tg Annealing; hereinafter occasionally abbreviated as "BTA treatment") in order to prevent a polyester support film with long length and broad width from generating the core-set curl, the above described winding distortion defect generates in the film at the proximity portion to the winding core (the portion apart less than 100 meters from the core in terms of the film length). As a result of extensive studies on the causes of generating the winding distortion defect made by the present inventor, the causes have been elucidated as follows.

That is, polyester films are frequently prepared by bi- or more axially stretching, generally, in the lengthwise and widthwise directions to acquire strong mechanical strength. The term "lengthwise direction" used means a direction which is generally called the "machine direction" (i.e., the extruding direction in a film-preparation), and the term "widthwise direction" used herein means the transverse direction which crosses the machine direction at right angles and which is in a plain parallel to the film surface. The stretching of the films, particularly in the widthwise direction, is carried out while chucking at both the side edge portions thereof, and therefore, stretching in the center portion occurs somewhat delayed as compared with those at the side edge portions. This difference in stretching appears in the films as orientation unevenness in the width direction (bowing). In applying heat to the films according to a BTA treatment or the like, such stretching unevenness in the width direction causes a local difference in shrinkage of the film, to thereby tends to cause a winding distortion defect.

The orientation unevenness in the widthwise direction (bowing) which causes a winding distortion defect can be detected with the greatest sensitivity by using a birefringence orientation meter. This measurement makes it possible to find an orientation angle which indicates the average orientation direction of molecules. That is, measurements of birefringence are done over all directions (360°), and the most frequent angle thereof is indicated as an "orientation angle", expressed by the angle from the lengthwise direction. In the orientation angle, the main axes of most molecules are oriented. Therefore, when the orientation angles are uniform in a film through the width direction, the main axes of molecules are oriented to the same direction, indicating that the orientation is uniform.

In film-forming processes, a widthwise stretching follows a lengthwise stretching, in general. Because a widthwise stretching is performed while chucking the films, the stretching initially occurs at the film side edge portions near the chucks so that molecules are oriented in the directions of combined vectors composed of both the magnifications of the lengthwise stretching and widthwise stretching. On the other hand, equal and opposite forces are exerted from both the side edges on the center portion of the film, and the composed force of the widthwise stretching becomes zero, thus leaving only the preceding molecular orientation in the lengthwise direction. As a result, orientation in the lengthwise direction is only left as an apparent molecular orientation so that the orientation angle becomes 90°. Accordingly, assuming values of the orientation angles are plotted through the width direction, the orientation angle is small in the side edge portions and prominently large in the center portion, forming a bow-like shape (bowing). Such difference in orientation angle, that is, a difference in the direction of molecular orientation, through the width direction produces ununiform heat shrinkage in the heat treatment, and the resultant ununiform shrinkage stress causes the winding-distortion.

Such bowing is particularly remarkable in polyethylene naphthalate (hereinafter occasionally abbreviated as "PEN") film. This is because the PEN film tends to generate necking as compared with polyethylene terephthalate (PET) film, etc., and to cause stretching unevenness. Further, the bowing tends to occur in thick film having a thickness of 60 μm or more, particularly 80 μm or more. This is because increase in thickness tends to generate stretching unevenness and to produce larger orientation unevenness.

Therefore, the difference in orientation angle between the center portion and the side edge portions of a support film to be subjected to a heat treatment (an average of the absolute values of the differences between the orientation angles in the side edge portions and that in the center portion in the width direction) is preferably from 0° to 40°, more preferably from 0° to 25°, and most preferably from 0° to 15°. Exceeding the above range often tends to generate a winding distortion defect during a heat treatment.

Assuming that the width of a roll of a support to be subjected to a BTA treatment is A (meter), the support having such orientation angles that satisfy the above requirement can be prepared by forming a film having a width of 2A (meter) or more and cutting down the film into the support having a width of A (meter). That is, if the orientation angle in both the side edge portions of the formed film having a width of 2A meter is $\theta_e$ (degree) and that in the center portion is $\theta_c$ (degree), the difference in orientation angle between the center portion and both the side edge portions becomes $(\theta_e-\theta_c)$ (degree). On the other hand, when the formed film is slit into two supports having a width of A (meter), the centers of the resulting supports are located in the mean point between the side edge portion and the center of the formed film. The orientation angle in this point will take almost an intermediate value of $\theta_e$ and $\theta_c$, $(\theta_e+\theta_c)/2$. Therefore, the difference in orientation angle between the side edge and the new center will be $\{\theta_e-(\theta_e+\theta_c)/2\}=(\theta_e-\theta_c)/2$, so that the difference in orientation angle can be halved. Similarly, when a film having a width of 3A (meter) is formed and slit into three strips having a width of A (meter), the difference in orientation angle of the middle strip will be $(\theta_e-\theta_c)/3$, further reducing the orientation angle difference. Thus, if a film having a broader width is formed and slit as many times as possible, smaller orientation angle difference can be achieved.

However, forming such a broad film has adversely presented a problem of enlarging the difference in orientation angle in the width direction. This tendency tends to occur, particularly when a formed film has a width of 1 meter or more.

This is because during the widthwise stretching the side edge portions of the film which are fixed with chucks is difficult to be stretched, whereas portions closer to the center thereof are easy to be stretched to decrease the thickness. Once such thin portions are formed, the force exerted on the portions per unit area increases so that the portions become easier to be stretched, and stretching in the portions is acceleratedly increased to promote the orientation as well. As a result, the difference in orientation angle between the center portion and the side edge portions also increases. This tendency markedly increases with increase in width of a film stretched.

Therefore, the slitting of the present invention is particularly effective with respect to a formed film having a width of 1 meter or more, more preferably from 1.5 to 15 m, and most preferably from 2 to 10 m. On the other hand, the upper limit of the width of a formed film is limited by film-forming machines, and the width exceeding 20 m is not practicable.

Further, the above described tendency is particularly marked with respect to a PEN film as compared with a PET film. This is presumed as corresponding the fact that a PEN film is liable to generate necking by small stress. This liability is presumed to be caused by the fact that the skeleton of PEN is constituted of naphthalene rings having higher flatness than PET, so that the molecules finely line up in a plane to form a multilayer structure, to make it difficult to entangle the layers one another.

However, the slitting time of a formed film is limited in view of producibility. That is, when the film having a constant width is slit many times, narrow supports each having a small width are produced, so that efficiency of the subsequent coating process such as undercoating and formation of a photosensitive layer is markedly impaired. On the other hand, in order to acquire a constant width of the supports in spite of too large slitting times of the film, the width of a formed film must be broadened, and therefore, huge film-forming equipment is required, which is difficult to realize in fact. The slit width of the support is preferably from 0.5 to 5 meters, more preferably from 0.8 to 4 meters, and most preferably from 1 to 3 meters. The number of strips slit out of a formed film is preferably from 2 to 30, more preferably from 2 to 10, and most preferably from 2 to 5.

Effective measures against this problem is to increase a thickness of the side edge portions of a unstretched film by 0.1% to 10%, more preferably by 0.2% to 5%, and most preferably by 0.3% to 3%, based on the average thickness (This ratio (%) is referred to as "thickening ratio" in the side edge portions). The width of such portions is preferably from 3 to 200 mm, more preferably from 5 to 100 mm, and most preferably from 10 to 50 mm.

The thickness of the side edge portions as used herein means an average value obtained by measuring thicknesses at 20 points at intervals of 5 cm through the lengthwise direction on one side along a line 5 mm apart from the side edge of an unstretched film. The average thickness herein means an average value obtained by measuring thicknesses at 20 points at equal intervals through the width direction of the unstretched film.

When the thickening ratio fails to reach the abovementioned ranges, the side edge portions are liable to be thinned by chucks, and therefore, stretching starts from these portions, resulting in increasing the difference between the orientation angle of the side edge portions and that of the center portion. If the thickening ratio further decreases, damage to a film might occur on chucking thereof. On the contrary, exceeding the ranges leads to the undesired enlarged difference in orientation angle as described above.

The width of such "thickening portions" of the side edge portions is preferably from 3 to 200 mm, more preferably from 5 to 100 mm, and most preferably from 10 to 50 mm. It is preferred that the thickness of the film does not abruptly but gradually decreases from the thickened portions of the side edge portions to the center portion. The decrease in thickness preferably occurs within a width of 0.1 to 200 mm.

A broad formed support having a width of 2 meters or more shows more prominent difference in orientation angle because the center of the support is easy to be stretched as described above.

One of effective measures to solve this problem is that a "middle portion" (an portion other than both the side edge portions, that is, an portion eliminating 10% from both the edge portions in the width direction) of an unstretched sheet is thickened preferably by 0.1% to 10%, more preferably by 0.2% to 5%, and most preferably by 0.3% to 3%, based on an average thickness (Such an portion is referred to as a "thickened portion"). The thickening ratio not reaching these ranges fails to fully give the effect, whereas exceeding the ranges adversely results in enlarging the difference in orientation angle, because stretching proceeds from the periphery of the thickened portion due to the concentration of stress.

The width of such a thickened portion in the middle portion is preferably from 3 to 200 mm, more preferably from 5 to 100 mm, and most preferably from 10 to 50 mm. The thickness in the middle portion is preferably increased with increase in width of a formed film. However, too much thickening in only one portion in the middle portion (for example, the center in the width direction) adversely tends to generate necking due to ununiformity in thickness in the width direction. Therefore, the "thickened portion" is preferably divided into two or more portions, more preferably 2 to 30 portions. Although the optimum number of the thickened portions varies depending on the characteristics of stretching machines and the conditions of stretching (magnification of stretching and stretching temperatures), rates of one area per 1 to 3 meters in the width direction are preferred, as a rule of thumb, in performing such thickening as described above.

It is preferred that the thickness does not abruptly but gradually decrease from the thickened portion to a flat portion. The decrease in thickness preferably occurs within width of 0.1 to 200 mm.

The adjustment of such thicknesses in the middle and side edge portions can be readily carried out by controlling in the width direction the intervals of the slit of a T-die connected to an extruder. That is, the slit is constituted of two plates and fixed to the T-die with plural bolts. The intervals of the slit can be minutely adjusted by controlling the force with which the bolts are tightened. Therefore, the thickness in the width direction can be more easily controlled with increase in number of the bolts used for tightening, that is, with decrease in distance of the intervals between the bolts. The control of such slit intervals can also be done by checking the intervals in the width direction by use of a thickness gauge or by practically measuring in the width direction the thicknesses of a film prepared by extruding a polymer through the T-die and then cooling it to solidify. The latter method is used in general.

Besides the adjustment of the T-die slit, a method used preferably is to produce depressions on a cooling drum, which follows an extruder, at the sites corresponding to the thickened portions in the circumference direction. In this method, a molten polymer extruded comforts to the depressions to achieve the thickening. To perform the thickening, the temperature of the cooling drum is an important factor, and preferably adjusted to (Tg−30° C.) to (Tg+30° C.). At temperatures not reaching this range, the molten polymer is cooled to solidify before flowing into the depression and comforting. On the other hand, at temperatures exceeding this range, the molten polymer takes a long time for thickening, making it impossible to increase the film-forming speed.

The supports for use in the present invention can be formed as described above. However, in order to prevent the supports from generating the core-set curl, which is one of the objectives of the present invention, the supports are subjected to heat treatment at temperatures of preferably from 50° C. to Tg, more preferably from 55° C. to (Tg−2° C.), and most preferably from 60° C. to (Tg−5° C.) (Hereinafter referred to as "BTA treatment").

The BTA treatment may be carried out at a constant temperature (constant temperature BTA treatment). In this case, the treatment time is preferably from 5 minutes to 1500 hours, more preferably from 10 minutes to 500 hours, and most preferably from 30 minutes to 200 hours.

The BTA treatment may also be carried out while gradually lowering temperature from Tg (gradual cooling BTA treatment). A method used more favorably is to gradually cool a film from a temperature of Tg or higher to a temperature less than Tg. In this case, the average cooling speed is preferably from −0.001° C./minute to −100° C./minute, more preferably from −0.001° C./minute to −10° C./minute, and most preferably from −0.001° C./minute to −1° C./minute. Further, this method also is preferably used in combination with the above described constant temperature BTA treatment.

Prior to these BTA treatments, the films may be subjected to "pre-BTA heat treatment" at temperatures of preferably from Tg to (Tg+130° C.), more preferably from (Tg+20° C.) to (Tg+110° C.), and most preferably from (Tg+30° C.) to (Tg+90° C.). The pre-BTA heat treatment is performed to completely destroy the heat history of a polyester support and make it easy to effectively conduct the BTA treatment. The pretreatment is, therefore, necessary to be carried out at a temperature of Tg or higher. However, exceeding (Tg+130° C.) generally introduces a problem in handling because of increase in fluidity of a base. Accordingly, the pre-heat treatment is preferably carried out in the above-mentioned range of temperature. The time for the pre-BTA heat treatment is preferably from 0.1 minute to 1500 hours, more preferably from 0.2 minute to 100 hours, and most preferably from 0.3 minute to 1 hour. Prolonged heat treatment over these ranges causes the base to be undesirably colored. The time not reaching the ranges-fails to fully provide the effect of the pre-BTA heat treatment which makes it easy to effectively conduct the BTA treatment.

When the support subjected to the BTA treatment or to the pre-BTA heat treatment followed by the BTA treatment is analyzed with a differential scanning calorimeter (Hereinafter occasionally abbreviated as "DSC"), a maximum endothermic peak appears between (Tg−20° C.) and (Tg+80° C.). The larger endothermic peak tends to prevent the core-set curl of the support.

When 10 mg of a sample is measured with a DSC in an atmosphere of nitrogen while raising temperature at a rate of 20° C./minute, the endotherm is preferably from 100 to 1000 mcal/g. The endotherm not reaching this range fails to sufficiently develop the winding habit, whereas exceeding the range results in saturating the effect of preventing the core-set curl. The endotherm is more preferably from 150 to 500 mcal/g, and most preferably from 200 to 400 mcal/g.

When a film wound round a roll is subjected to the heat treatment as in the present invention, the initial winding tension per unit width of the roll is preferably from 3 to 75 kg/m, more preferably from 10 to 40 kg/m, and most preferably from 12 to 30 kg/m. The tension at the end of winding is preferably from 3 to 75 kg/m, more preferably from 5 to 35 kg/m, and most preferably from 7 to 30 kg/m. The tension not reaching the ranges results in deforming a roll wound loosely by its own weight during the heat treatment, whereas exceeding the ranges results in generating wrinkles due to tightening in winding. Further, it is preferred that the tension at the beginning of winding is stronger than that at the end. The winding is preferably carried out with the surface for providing backing layers turned inward.

Further, the diameter of the winding core round which a support is wound is preferably from 50 to 2000 mm, more preferably from 100 to 1000 mm, and most preferably from 150 to 600 mm. When the diameter exceeds these ranges, handling such as transport becomes difficult. On the other hand, the diameter not reaching the ranges results in increasing the number of times the support is wound, to thereby increase in heat shrinkage stress which the support close to the winding core undergoes, causing the flatness to be deteriorated.

The materials of the winding core for use in the heat treatment are not particularly limited. However, the materials which do not undergo a decrease in strength or deformation due to heat are preferably used, and include, for example, stainless steel, aluminum and glass fiber-reinforced resins. The winding cores formed thereof may be further lined with rubber or resins as needed. Furthermore, the winding cores may have a hollow structure to transmit heat to the film more efficiency, or a structure in which an electrical heater is housed or through which a high-temperature liquid is passed to make heating possible.

Although such heat treatment can be performed at any stage between the formation of a film and the coating of photosensitive layers, the heat treatment is preferably carried out at a time before undercoating for the photosensitive layers and after the surface treatment.

The polyester support for use in the present invention is described below.

The polyester supports which can be preferably used in the present invention are aromatic polyesters which have excellent mechanical characteristics and heat resistance. Although polyesters are generally produced from diols and dicarboxylic acids which are essential components, the aromatic polyesters comprises a dicarboxylic acid component mainly comprising an aromatic dicarboxylic acid. The dicarboxylic acid component may further comprise aliphatic or alicyclic dicarboxylic acids as needed. Preferred examples of the aromatic dicarboxylic acids include 2,6-, 1,5-, 1,4-, and 2,7-naphthalene dicarboxylic acids (NDCA), terephthalic acid (TPA), isophthalic acid (IPA), orthophthalic acid (OPA), p-phenylene dicarboxylic acid (PPDC), and the ester products thereof. Of these, 2,6-naphthalene dicarboxylic acid (2,6-NDCA) and the ester products thereof are particularly preferred.

However, the use of a hydrophilic monomer such as 3-sulfoisophthalic acid salts and sulfonaphthalene dicarboxylic acid salts in the copolymerization is not undesirable, because such copolymerization causes deterioration in mechanical strength (particularly, elastic modulus in bending) due to water absorbed during processing.

Preferred diols are ethylene glycol (EG), cyclohexane dimethanol (CHDM), neopentyl glycol (NPG), bisphenol A (BPA), and biphenol (BP). Of these, ethylene glycol is particularly preferred.

Polyalkylene glycols such as polyethylene glycol, polypropylene glycol, polytetramethylene glycol are not preferred, because the use thereof causes deterioration in mechanical strength (particularly, elastic modulus in bending) due to water absorbed during processing.

Hydroxy carboxylic acids such as p-hydroxybenzoic acid (PHBA) and 6-hydroxy-2-naphthalene carboxylic acid (HNCA) may be used for preparing the polyesters. Naphthalene dicarboxylic acid residues and ethylene glycol residues may be allowed to exist in the form of copolymer or polymer blend.

Monofunctional or polyfunctional (trifunctional or more) hydroxy group-containing compounds (for example, pentaerythritol and glycerin) or acid group-containing compounds (for example, trimellitic acid) may be copolymerized with the above described components, as long as the resulting polyesters are substantially linear.

In the polyester for use the present invention, hydroxy carboxylic acids which contain both a hydroxy group and a carboxyl group in the molecule (for example, aromatic oxy acids such as hydroxybenzoic acids and ω-hydroxycaproic acid) can be copolymerized.

Monofunctional compounds such as benzoic acid, naphthalene monocarboxylic acids and methoxypolyalkylene glycol may be used in order to block terminal hydroxy groups.

The glass transition temperature (Tg) of these polyesters are preferably from 65° C. to 200° C., more preferably from 80° C. to 190° C., and most preferably from 100° C. to 180° C. In general, photographic films of the present invention may be exposed to an environment at 65° C., the presumable maximum temperature at the store front in summer. Therefore, the supports are required to have a Tg higher than this temperature. Further, when left in a car parked outdoor in midsummer, the supports may reach temperatures of 80° C. or more as the most severe conditions to which the supports may be exposed, though it may rarely happen. Therefore, the supports more preferably have a Tg higher than 90° C. On the other hand, versatile and transparent polyesters having a Tg exceeding 200° C. have not been exploited yet.

To acquire such polyesters, the polyester preferably comprises polyethylene naphthalate as a main component. Polyesters comprising naphthalene dicarboxylic acid can be relatively easily raised their Tg, and in addition, increased in mechanical strength such as Young's modulus, because of the rigid molecular structure thereof.

In such polyesters comprising polyethylene naphthalate as a main component, the content of 2,6-naphthalene dicarboxylic acid in the whole dicarboxylic acid residues is preferably 50 mol % or more, more preferably 70 mol % or more, and most preferably 90 mol % or more. This may be a copolymer or a polymer blend. In view of compatibility with polyethylene naphthalate, preferred counterparts for the polymer blends include polyethylene terephthalate (PET), polyacrylate (PAr), Polycarbonate (PC), and polycyclohexanedimethanol terephthalate (PCT).

However, polyethylene naphthalate homopolymers are most preferred, and polyethylene 2,6-naphthalate homopolymer is particularly preferred.

These homopolymers and copolymers can be produced according to known processes for preparing polyesters. For example, a direct esterification reaction between an acid and a glycol may be carried out (direct polymerization process), or a dialkylester (for example, dimethylester or diethylester is preferred) used as an acid component may undergo an ester exchange reaction with a glycol component, and the excess glycol component is then removed with the aid of heat under reduced pressure (ester exchange process). Further, an acid halide prepared as an acid component is allowed to react with a glycol. Of these, the ester exchange process is preferred.

In these polymerization processes, catalysts for ester exchange reactions or catalysts for polymerizations may be used, or stabilizers to heat (for example, phosphorous acid, phosphoric acid, trimethyl phosphate, triethyl phosphate and tetraethylammonium) may be added, as needed.

Details of the preparation processes of these polyesters are described, for example, in *Kobunshi Jikken Kagaku* (Polymeric Experimental Chemistry), Vol. 5 (Polycondensation and Polyaddition), Kyoritsu Shuppan, 1980, pp. 103–136; *Synthetic Polymers V*, Asakura Shoten, 1971, pp. 187–286; JP-A-5-163337, JP-A-3-179052, JP-A-2-3420, JP-A-1-275628, JP-A-62-290722, JP-A-61-241316, etc.

The intrinsic viscosity of the polymer thus prepared, which is measured in o-chlorophenol solvent at 35° C., is preferably from 0.40 to 0.9, and more preferably from 0.45 to 0.70.

Preferred examples of the polyester for use in the present invention are shown below. However, the present invention is not limited by these examples.

Examples of Homopolymers:

HP-1: Polyethylene Naphthalate (PEN)    Tg = 119° C.
[2,6-naphthalene dicarboxylic acid (NDCA)/ethylene glycol (EG) (100/100)](PEN)
HP-2: Polyethylene Terephthalate (PET)    Tg = 69° C.
[terephthalic acid (TPA)/ethylene glycol (EG) (100/100) (PET)

Examples of Copolymers:

(Numerals in parenthesis show molar ratios)
CP-1: 2,6-NDCA/TPA/EG (50/50/100)    Tg = 92° C.
CP-2: 2,6-NDCA/TPA/EG (75/25/100)    Tg = 102° C.
CP-3: 2,6-NDCA/TPA/EG/BPA (50/50/75/25)    Tg = 112° C.
CP-4: 2,6-NDCA/EG/BPA (100/50/50)    Tg = 155° C.
CP-5: 2,6-NDCA/EG/BPA (100/25/75)    Tg = 155° C.
CP-6: 2,6-NDCA/EG/CHDM/BPA (100/25/25/50)    Tg = 150° C.
CP-7: 2,6-NDCA/NPG/EG (100/70/30)    Tg = 145° C.
CP-8: 2,6-NDCA/EG/BP (100/20/80)    Tg = 130° C.
CP-9: PHBA/EG/2,6-NDCA (200/100/100)    Tg = 150° C.

Examples of Polymer Blends:

(Numerals in parenthesis show weight ratios):
PB-1: PEN/PET (60/40)    Tg = 95° C.
PB-2: PEN/PET (80/20)    Tg = 104° C.
PB-3: PAr/PEN (15/85)    Tg = 138° C.
PB-4: PAr/PCT/PEN (10/10/80)    Tg = 135° C.
PB-5: PAr/PC/PEN (10/10/80)    Tg = 140° C.
PB-6: PEN/PET/PAr (50/25/25)    Tg = 108° C.

Ultraviolet absorbers may be incorporated into these polyesters for obtaining stability to aging. It is desirable that the ultraviolet absorbers do not absorb in the visible light range. The content thereof based on weight of polymer films is usually from 0.5 to 20% by weight, and preferably from 1 to 10% by weight. Less than 0.5% by weight of the ultraviolet absorbers can not be expected to provide the effect of preventing deterioration due to ultraviolet rays. Examples of the ultraviolet absorber include benzophenone series absorbers such as 2,4-dihydroxybenzophenone, 2-hydroxy-4-methoxybenzophenone, 2-hydroxy-4-n-octoxy-benzophenone, 4-dodecyloxy-2-hydroxybenzophenone, 2,2',4,4'-tetrahydroxybenzophenone and 2,2'-dihydroxy-4,4'-dimethoxybenzophenone; benzotriazole series absorbers such as 2-(2'-hydroxy-5-methylphenyl)benzotriazole, 2-(2'-hydroxy-3',5'-di-t-butylphenyl)benzotriazole and 2-(2'-hydroxy-3'-di-t-butyl-5'-methylphenyl)benzotriazole; and salicylic acid series absorbers such as phenyl salicylate and methyl salicylate.

The aromatic polyester has higher refractive indexes of 1.6 to 1.7, whereas gelatin which is a main component of photosensitive layers provided on the polyesters has lower refractive indexes of 1.50 to 1.55. Therefore, when light enters the films from the side edges thereof, it is reflected at the interfaces between the base and the emulsion layer so that a light-piping phenomenon (edge fogging) occurs.

There are known methods of incorporating inactive inorganic particles into films and those of adding dyes thereto in order to avoid the above described light-piping phenomenon. The method of adding the dyes is preferably used in the present invention, because they do not markedly increase film haze.

Grey dyes are preferably used for dyeing the polyester film in view of general properties of photosensitive materials, and it is preferred that the dyes have excellent heat resistance in the temperature region in which the polyester film are made, as well as excellent compatibility with the polyester.

From these viewpoints, commercially available dyes such as Diaresin manufactured by Mitsubishi Kasei Corporation and Kayaset manufactured by Nippon Kayaku Co., Ltd. can be used in adixture to achieve the purpose. Dyes as described in JP-A-7-191430 are preferably used, particularly, in view of the stability to heat.

Slipperiness can be imparted to the polyester film of the present invention depending on the intended use, and incorporating inactive inorganic particles into the film or coating with a surfactant can be carried out as common means.

Examples of the inactive inorganic particles used for such purpose include silicon dioxide ($SiO_2$), titanium dioxide ($TiO_2$), barium sulfate ($BaSO_4$), calcium carbonate ($CaCO_3$), talc, and kaolin. In order to impart slipperiness to the polyester film, an internal particle process in which catalysts added upon polymerizing are allowed to precipitate can also be utilized, in addition to the above described external process in which the inactive particles are added to polyester synthesis reaction systems. For the external particle process, silicon dioxide which has a refractive index relatively close to that of the polyester films is preferably used, or an internal particle process which enables precipitated particles to have relatively small diameter is desirably adopted.

Further, a method of laminating a functional layer on a film can also be preferably used to enhance the transparency of the film. Means for the lamination include, for example, co-extrusion technique by the use of a plurality of extruders, a feed block or a multimanifold die.

Surface treatment for the support for use in the present invention is described below.

Effective measures for allowing photographic layers (for example, photosensitive silver halide emulsion layers, interlayers, filter layers, electrically conductive layers, etc.) to strongly adhere to the support formed of a polyester of the present invention include a method of performing surface activation treatment followed by direct formation of a photographic layer and a method of performing the surface activation treatment followed by successive formation of an undercoat layer and a photographic emulsion layer, the surface activation treatment including chemical treatments, mechanical treatments, corona discharge treatments, flame treatments, ultraviolet light treatments, high-frequency treatments, glow discharge treatments, activated plasma treatments, laser ray treatments, mixed acid treatments and ozone oxidation treatments, as described, for example, in U.S. Pat. Nos. 2,698,241, 2,764,520, 2,864,755, 3,462,335, 3,475,193, 3,143,421, 3,501,301, 3,460,944, and 3,674,531, British Patents 788,365, 804,005 and 891,469, JP-B-48-43122 (The term "JP-B" as used herein means an "examined Japanese patent publication"), JP-B-51-446, etc.). Of these surface treatments of the supports, corona discharge treatments, ultraviolet light treatments, glow discharge treatments and flame treatments are more effective, and particularly, glow discharge treatments is effective.

These surface treatments can be carried out according to the procedures as described in Japan Institute of Invention and Innovation, *Journal of Technical Disclosure*, No. 94-6023.

An antistatic layer is preferably provided on the support of the present invention. Antistatic agents for use in the antistatic layer are not particularly limited. Electrically conductive antistatic agents or compounds having a function of regulating series of frictional electrification may also be used.

Examples of the electrically conductive antistatic agent include metal oxides and ionic compounds. The antistatic agent preferably used in the present invention are electrically conductive metal oxides and their derivatives, electrically conductive metals, carbon fiber, and π-conjugated system polymers (polyarylenevinylene, etc.) and the like, which do not lose antistatic effect even after processing. Of these, particularly preferred electrically conductive materials are crystalline metal oxide particles.

The electrically conductive metal oxide particles are most preferably fine particles of at least one crystalline metal oxide selected from zinc oxide (ZnO), titanium dioxide ($TiO_2$), tin oxide ($SnO_2$), aluminum oxide ($Al_2O_3$), indium oxide ($In_2O_3$), silicon dioxide ($SiO_2$), magnesium oxide (MgO), barium oxide (BaO), molybdenum oxide ($MoO_3$) and vanadium pentoxide ($V_2O_5$), and fine particles of compound oxides from these metal oxides. Of these, particularly preferred electrically conductive materials are those which contain tin oxide as a main component and about 5% to 20% of antimony oxide and/or other components (for example, silicon oxide, boron, phosphorus, etc.). The fine particles of these electrically conductive crystalline oxides and of the compound oxides thereof preferably have a volume resistivity of $10^7$ Ωcm or less, more preferably $10^6$ Ωcm or less, and most preferably $10^5$ Ωcm or less.

Details of these electrically conductive materials and coating methods are described in Japan Institute of Invention and Innovation, *Journal of Technical Disclosure*, No. 94-6023, and formation of the antistatic layer can be put into practice according thereto.

The undercoat layer which are provided between the surface-treated support and a photosensitive layer is described below.

The formation of the undercoat layer can be carried out by one of the following two methods: a multilayer-superposing method in which a first layer that well adheres to a support (hereinafter abbreviated as a "first undercoat layer") and a second layer that well adheres to both the first undercoat layer and a photographic layer (hereinafter abbreviated as a "second undercoat layer) are successively provided; and a monolayer method in which only one layer that well adheres to both a support and a photographic layer is provided.

In the multilayer-superposing method, examples of the material for use in the first undercoat layer include, for example, copolymers prepared from monomers selected from vinyl chloride, vinylidene chloride, butadiene, vinyl acetate, styrene, acrylonitrile, methacrylic acid esters, methacrylic acid, acrylic acid, itaconic acid, maleic anhydride, etc.; epoxy resin; gelatin; nitrocellulose; and polyvinyl acetate. The second undercoat layer generally comprises gelatin as a main component.

In the monolayer method, good adhesion is obtained, in many cases, by swelling a support and interface mixing the swelled support with a polymer for undercoating. Examples of the polymer for undercoating include water-soluble polymers such as gelatin and the derivatives thereof, casein, agar, sodium alginate, starch, polyvinyl alcohol, polyacrylic acid copolymers and maleic anhydride-copolymers; cellulose esters such as carboxymethyl cellulose and hydroxyethyl cellulose; and latex polymers such as vinyl chloride-containing copolymers, vinylidene chloride-containing copolymers, acrylic ester-containing copolymers and vinyl acetate-containing copolymers. Of these, gelatin is preferred. The gelatin for use in the present invention may be any of known gelatin used in the art such as lime-treated gelatin, acid-treated gelatin, enzyme-treated gelatin, gelatin derivatives and modified gelatin. Of these, lime-treated gelatin and acid-treated gelatin are most preferred.

The above described polymer for undercoating can be hardened. Examples of the hardening agents include chromium salts (chromium alum, etc.), aldehydes (formaldehyde, glutaraldehyde, etc.), epoxy compounds, isocyanates, activated halogen compounds (such as 2,4-dichloro-6-hydroxy-s-triazine, epichlorohydrin resins, polyamide-epichlorohydrin resins and cyanuric chloride series compounds), vinyl sulfone and sulfonyl series compounds, carbamoyl ammonium salt series compounds, amidinium salt series compounds, carbodiimide series compounds and pyridinium salt series compounds.

In the present invention, various additives can be incorporated into the undercoat layer as needed. They are, for example, surfactants, antistatic agents, dyes for coloring antihalation agents, pigments, coating aids and antifoggants, etc.

Further, inorganic or organic fine particles can be added as matting agents to the undercoat layer for use in the present invention, as long as the transparency and graininess of images are not substantially impaired. Inorganic fine particles used as the matting agents include silica ($SiO_2$), titanium dioxide ($TiO_2$), calcium carbonate and magnesium carbonate. Organic fine particles used as the matting agents include polymethyl methacrylate, cellulose acetate propionate, polystyrene, materials soluble in processing solutions as described in U.S. Pat. No. 4,142,894, and polymers as described in U.S. Pat. No. 4,396,706. These fine particulate matting agents have preferably an average particle size of 0.01 to 10 μm, and more preferably 0.05 to 5 μm. Further, the amount thereof to be applied is preferably from 0.5 to 600 mg/m², and more preferably from 1 to 400 mg/m².

In the present invention, examples of the compound for use in swelling the support include are resorcin, chlororesorcin, o-cresol, m-cresol, p-cresol, phenol, o-chlorophenol, p-chlorophenol, dichlorophenol, trichlorophenol, monochloroacetic acid, dichloroacetic acid, trifluoroacetic acid, chloral hydrate, and the like. Of these, resorcin and p-chlorophenol are preferred.

Details of the undercoating materials are described in Japan Institute of Invention and Innovation, *Journal of Technical Disclosure*, No. 94-6023, and formation of the undercoat layer can be put into practice according thereto.

The above described undercoating solution can be applied to the support by a well-known method such as dip coating, air knife coating, curtain coating, roller coating, wire bar coating, gravure coating, or the extrusion coating using a hopper, as described in U.S. Pat. No. 2,681,294. Further, two or more layers can be simultaneously coated, as needed, by the method as described in U.S. Pat. Nos. 2,761,791, 3,508, 947, 2,941,898 and 3,526,528, Yuji Harazaki, *Coating Engineering*, Asakura Shoten, 1973, p. 253, etc.

Formation of the undercoat layer is preferably carried out after the heat treatment of the present invention. The undercoat layer formed for imparting adhesion properties often have stickiness. Therefore, formation of the undercoating layer before the heat treatment is unfavorable because it tends to generate blocking.

Further, in the present invention, the support can be used for the sensitive materials having a photosensitive silver halide emulsion layer on both sides or on only one side thereof. In case that the support has an emulsion layer on one side thereof, a backing layer is preferably formed on the opposite side thereof. The backing layer generally comprises several layers to develop various functions, such layers including, for example, a contact layer, an antistatic layer, a layer imparting abrasion resistance, a slippery layer, an antiblocking layer, an anticurl layer, and the like. In addition, a transparent magnetic recording layer as described in U.S. Pat. Nos. 3,782,947 and 4,279,945 may also be provided.

The order of these layers and the thicknesses thereof are not particularly limited, and in some cases, two or more layers having the same function may be separately provided. The thickness of each layer is preferably from 0.0001 to 10 μm, and more preferably from 0.001 to 5 μm. The total thickness of the backing layers is preferably from 0.001 to 10 μm.

The constituent layers of the back side each may be formed from only a material which have the respective function. However, the materials are commonly used together with a binder. The binder may be a hydrophobic polymer or a hydrophilic polymer as used for the undercoat layer, or may be crosslinked like a latex.

One of the backing layers having various functions is an antistatic layer, which can be provided by the method as described above.

Known examples of lubricants for use in the slippery layer are polyorganosiloxanes as disclosed in JP-B-53-292, higher fatty acid amides as disclosed in U.S. Pat. No. 4,275,146, higher fatty acid esters (esters of a fatty acid having 10 to 24 carbon atoms with an alcohol having 10 to 24 carbon atoms) as disclosed in JP-B-58-33541, British Patent 927,446, JP-A-55-126238 and JP-A-58-90633, Metal salts of higher fatty acids as disclosed in U.S. Pat. No. 3,933,516, esters of a straight chain higher fatty acid with a straight chain higher alcohol as disclosed in JP-A-58-50534, and esters of a higher fatty acid containing a branched chain alkyl group with a higher alcohol as disclosed in International Publication No. 90108115.8.

Examples of the polyorganosiloxanes include commonly known polyalkylsiloxanes such as polydimethylsiloxane and polydiethylsiloxane, polyarylsiloxanes such as polydiphenylsiloxane and polymethylphenylsiloxane, organopolysiloxanes containing an alkyl group having 5 or more carbon atoms as described in JP-B-53-292, JP-B-55-49294, and JP-A-60-140341, alkylpolysiloxanes containing a polyoxyalkylene group in the side chain, and modified organopolysiloxanes containing an alkoxy group, a hydroxy group, a hydrogen atom, a carboxyl group, an amino group or a mercapto group in the side chain. In addition, block copolymers containing a siloxane unit, and graft copolymers containing a siloxane unit in the side chain shown in JP-A-60-191240 can also be used as the slip agents.

Examples of the higher fatty acid and the derivatives thereof and the higher alcohols and the derivatives thereof include higher fatty acids, metal salts of higher fatty acids, higher fatty acid esters, higher fatty acid amides, higher fatty acid esters of polyhydric alcohols, and the like; higher aliphatic alcohols, and monoalkylphosphites, dialkylphosphite, trialkylphosphites, monoalkylphosphates, dialkylphosphates and trialkylphosphates thereof; and higher aliphatic alkylsulfonates, and amides and salts thereof. Materials constituting the slippery layer are described in detail in Japan Institute of Invention and Innovation, *Journal of Technical Disclosure*, No. 94-6023, and formation of the slip layer can be carried out according thereto.

Although the use amount of these lubricants is not particularly limited, the amount thereof to be used to develop sufficient slipperiness and abrasion resistance is preferably from 0.001 to 0.1 g/m², and more preferably from 0.005 to 0.05 g/m².

Most of these lubricants have high hydrophobic nature, to exhibit poor solubility in solvents. To solve this problem, there are a method of dissolving the lubricant in a nonpolar organic solvent such as toluene and xylene, and a method of dispersing the lubricant in a coating solution, and the latter method is preferably used, because nonpolar organic solvents are difficult to handle.

A commonly known emulsification-dispersion method can be utilized to disperse the lubricant. Specifically, there are a method of dissolving the lubricant in an organic solvent and emulsifying in water, a method of melting the lubricant at high temperature and emulsifying in water, a method of solid-dispersing the lubricant using a sand mill or a sand grinder, and the like. These emulsification-dispersion methods are described in *Handbook of Emulsification and Dispersion Technique and Application*, Edited by Karigome, Koishi and Hidaka, Science Forum edition, etc.

In order to record various information, a magnetic recording layer as described in JP-A-6-059357 can be provided on the silver halide photographic material of the present invention. The magnetic recording layer is preferably provided on the back side of the support by coating or printing. Further, a space can also be provided in the photographic material in order to optically record various kinds of information.

Silver halide photosensitive layers are provided on the support having an undercoat layer and backing layers provided thereon.

The silver halide emulsion layer may be any of layers for a color photograph or a black-and-white photograph. Photosensitive layers as described in Japan Institute of Invention and Innovation, *Journal of Technical Disclosure*, No. 94-6023 are preferably provided.

Evaluating and measuring methods used in the present invention are described below.

(1) Orientation Angle:

After forming a film or after slitting the formed film, samples having a size of 7 cm in the widthwise direction and 10 cm in the lengthwise direction were cut out of the film at the center portion of the film and at portions centered at the respective lines 7 cm apart from both side edges of the support, respectively. By the use of a "automatic birefringence orientation meter" (model KOBURA-21DH, manufactured by Shin Oji Paper Co. Ltd.), measurements were made at 360 points for each portions over 360° at a wavelength of 590 nm to determine an orientation angel (the incline of optical principal axis: Incline).

When the orientation angle of the center portion is $\theta_c$, that of one side edge portion is $\theta_{e-1}$, and that of the other side edge portion is $\theta_{e-2}$, the average of (a) the absolute value of the difference between $\theta_c$ and $\theta_{e-1}$ and (b) the absolute value of the difference between $\theta_c$ and $\theta_{e-2}$ was made the "difference in orientation angle".

(2) Glass Transition Temperature (Tg):

(1) Ten mg of a sample was placed in a pan made of aluminum under a stream of nitrogen.

(2) Using a differential scanning calorimeter (DSC), measurements were performed in a stream of nitrogen according to the following procedure.

(a) Temperature was raised up to 300° C. at a rate of 20° C./minute (1st run).

(b) The sample was rapidly cooled to room temperature to render it amorphous.

(c) Temperature was raised again at a rate of 20° C./minute (2nd run).

The Tg was defined as the arithmetic mean of a temperature at which deviation from a base line begins in the second run and a temperature at which the deviation converges again on the base line.

The present invention will be described in more detail with reference to the following Examples, but the invention should not be construed as being limited thereto.

EXAMPLE (1) Preparation of Support (1-1) Preparation of Polyethylene Support:

(HP-1): Polyethylene 2,6-naphthalate (PEN) into which each 54 ppm of dyes described in JP-A-7-168309, compound I-6, compound I-24, and 0.1% of spherical particles of silica, based on the solid content of PEN, were incorporated was prepared according to conventional ester exchange reaction procedure. The intrinsic viscosity thereof was 0.62. The pellets were dried at 170° C. for 4 hours, melted at 300° C., extruded from a T-die, and then rapidly cooled to prepare an unstretched film. Then, the lip intervals of the T-die were adjusted so that the unstretched film had a thickness distribution at the side edge portions and other portions (middle portions) in the widthwise direction. That is, the thicknesses in both the side edge portions were increased by Te %, respectively, based on the average thickness of the film. In the middle portion, the lip intervals were adjusted so that n number of band shaped thickened portions (the portions thickened by Tc % based on the average thickness) were produced along the lengthwise direction at equal intervals in the widthwise direction (The values of Tc % were the same in each thickened portions). In Table 1, Te % and Tc % are indicated as "thickening ratios", and the number of thickened portions in the middle portion (except both the side edges) as "number of thickening". The film was biaxially stretched, three times in the lengthwise direction at 140° C. and 3.2 times in the widthwise direction at 130° C. in succession, and thereafter, was subjected to thermal fixation under 3% relaxation at 245° C. for 30 seconds, thus obtaining a support having a width as shown in Table 1. In all levels the thickness and the length of the support were 90 μm and 3000 m, respectively. The width of the formed film is given by the number of slits multiplied by the slit width shown in Table 1 plus 0.15 (meter). The film had a Tg of 119° C.

(1-2) Preparation of Copolymer and Polymer Blend Supports

CP-2: A polyester copolymer composed of 2,6-naphthalene dicarboxylic acid dimethyl ester/terephthalic acid dimethyl ester/ethylene glycol (molar ratio: 75/25/100) was prepared according to conventional ester exchange reaction procedure. The intrinsic viscosity thereof was 0.62. The same dyes and spherical particles of silica as those used in the above described PEN support were incorporated into this polymer in the same amounts as given above. The polyester copolymer was melted at 300° C., extruded from a T-die, the lip intervals of which were adjusted so as to have thickness distribution (the number of thickening and the thickening ratio) as shown in Table 1, and rapidly cooled to prepare an unstretched film. The film was then biaxially stretched three times in the lengthwise direction at 140° C. and 3.2 times in the widthwise direction at 130° C. under the same conditions as those in the above described PEN support, and subsequently, subjected to thermal fixation under 3% relaxation at 220° C. for 30 seconds, thus obtaining a support having a width shown in Table 1. In all levels, the width and the length of the support were 90 μm and 3000 m, respectively. The width of the formed film is given by the number of slits multiplied by slit width shown in Table 1 plus 0.15 (meter). The film had a Tg of 102° C.

PB-3: A polyarylate (intrinsic viscosity: 0.55) prepared by polymerizing terephthalic acid with bisphenol A according to conventional procedure and PEN prepared according to the above described procedure were mixed in a weight ratio of 15:85, and further, the same dyes and spherical particles of silica as those used in the above described preparation of the PEN support were incorporated into the polymer in the same amounts as given above. The resulting mixture was blended by using a biaxial kneading extruder at 300° C., and then molded into pellets. The pellets were melted at 300° C. and extruded from a T-die, the lip intervals of which were adjusted so as to give thickness distribution (the number of thickening and thickening ratio) shown in Table 1, and rapidly cooled to prepare an unstretched film. The film was biaxially stretched three times in the lengthwise direction at 145° C. and 3.2 times in the widthwise direction at 150° C. in succession, and thereafter, subjected to thermal fixation under 3% relaxation at 240° C. for 30 seconds, thus obtaining a support with a width shown in Table 1. In all levels, the thickness and the length were 90 μm and 3000 m, respectively. The width of the film formed is given by the number of slits multiplied by slit width shown in Table 1 plus 0.15 (meters). The film had a Tg of 138° C.

(1-3) Preparation of PET Support (HP-2)

A PET polymer having an intrinsic viscosity of 0.56 was prepared according to conventional procedure. This polymer was dried under the same conditions as those in the above described preparation of PEN, and thereafter, the same dyes and spherical particles of silica as those in the above described PEN were added to the polymer in the same amounts as given above. The polymer was melted at 290° C. and extruded from a T-die, the lip intervals of which were adjusted so as to give a thickness shown in Table 1, and then rapidly cooled to prepare an unstretched film. The film was biaxially stretched 3.3 times in the lengthwise direction at 95° C. and 3.6 times in the widthwise direction at 100° C. in succession, and thereafter, subjected to thermal fixation under 3% relaxation at 235° C. for 30 seconds, thus obtaining a support with a width shown in Table 1. In all levels, the thickness and the length were 90 μm and 3000 meters, respectively. The width of the film formed is given by the number of slits multiplied by the slit width shown in Table 1 plus 0.15 (meters). The film had a Tg of 69° C.

(2) Slitting of Supports

The supports which had subjected to thermal fixation were slit times of the number as shown in Table 1 so as to be equal in slit width, respectively, and the entire length of each of the slit supports was wound round a roll. Slitting was performed according to conventional procedure, and at the same time, thickness-developing processing (knurling) (10 mm in width and 20 μm in height) was carried out in both the side edges of the supports slit. The rolls of the slit supports were numbered from an side edge of the support before slitting, which is shown in Table 1 as slit number.

The slit supports were thus sampled, and the orientation angles thereof were measured to determine differences in orientation angle (The side closer to the side edge of a support before slitting was made "edge B", and the other side as "ledge A"). The results are shown in Table 1.

Slitting was not performed as to some samples, the orientation angles of which were measured in both the side edges and the center thereof. The results are shown in Table 1.

TABLE 1

| | | Thickness Distribution of Unstretched Film | | | | | |
| | | Edge Portion | Middle Portion | | | | |
| | | Thickening | | Thickening | | Slit | |
| Level | Support | Ratio (%) | Number of Thickening | Ratio (%) | Number | width (meter) | Slit No. |
|---|---|---|---|---|---|---|---|
| 1 | HP-1 | 0.8 | 1 | 0.8 | 2 | 1.5 | 1 |
| 2 | HP-1 | 0.8 | — | — | 1 | 1.5 | — |
| 3 | HP-1 | 0.08 | — | — | 1 | 1.5 | — |
| 4 | HP-1 | 0.12 | — | — | 1 | 1.5 | — |
| 5 | HP-1 | 9.0 | — | — | 1 | 1.5 | — |
| 6 | HP-1 | 0.12 | 1 | 0.12 | 2 | 1.5 | 1 |
| 7 | HP-1 | 9.0 | 1 | 0.48 | 2 | 1.5 | 1 |
| 8 | HP-1 | 0.8 | 2 | 0.8 | 3 | 1.5 | 1 |
| 9 | HP-1 | 0.8 | 2 | 0.8 | 3 | 1.5 | 2 |
| 10 | HP-1 | 0.8 | 4 | 0.8 | 5 | 1.5 | 1 |
| 11 | HP-1 | 0.8 | 27 | 0.8 | 28 | 0.6 | 1 |
| 12 | HP-1 | 0.8 | 2 | 0.8 | 3 | 4.5 | 1 |
| 13 | HP-1 | 0.8 | — | 0.8 | 3 | 13.5 | 1 |
| 14 | HP-2 | 0.8 | 1 | 0.8 | 2 | 1.5 | 1 |
| 15 | CP-2 | 0.8 | 1 | 0.8 | 2 | 1.5 | 1 |
| 16 | PB-3 | 0.8 | 1 | 0.8 | 2 | 1.5 | 1 |

| | Orientation Angle | | | | Length of Distortion Developed | |
| Level | Edge A (deg) | Middle (deg) | Edge B (deg) | Difference in Orientation Angle (deg) | on Winding after BTA Treatment (meter) | Notes |
|---|---|---|---|---|---|---|
| 1 | 63 | 73 | 81 | 9 | 5.2 | Invention |
| 2 | 52 | 84 | 52 | 32 | 18.6 | Invention |
| 3 | 43 | 89 | 45 | 45 | 78.5 | Comparative Example |
| 4 | 48 | 86 | 48 | 38 | 36.6 | Invention |
| 5 | 49 | 88 | 51 | 38 | 38.2 | Invention |
| 6 | 47 | 65 | 85 | 19 | 25.5 | Invention |
| 7 | 52 | 70 | 88 | 18 | 22.2 | Invention |
| 8 | 62 | 66 | 70 | 4 | 3.8 | Invention |
| 9 | 70 | 88 | 72 | 17 | 19.8 | Invention |
| 10 | 62 | 64 | 66 | 2 | 2.3 | Invention |
| 11 | 63 | 63 | 63 | 0 | 2.0 | Invention |
| 12 | 61 | 65 | 69 | 4 | 10.5 | Invention |
| 13 | 56 | 80 | 58 | 23 | 28.8 | Invention |
| 14 | 66 | 72 | 79 | 6 | 4.5 | Invention |
| 15 | 60 | 75 | 82 | 16 | 28.9 | Invention |
| 16 | 62 | 74 | 82 | 11 | 7.5 | Invention |

The supports of all levels were subjected to the following surface treatment, formation of an electrically conductive layer, BTA treatment, and undercoating.

(2) Surface Treatment of Support

A glow surface treatment was performed under the following conditions.

Four cylindrical bar electrodes having a diameter of 2 cm and a length of 120 cm were fixed to a insulating panel at intervals of 10 cm. This electrode panel was mounted in a vacuum tank, and the support was passed with opposing to the electrode panel at 15 cm apart from the electrodes so as to undergo the surface treatment for 2 seconds. A heating roll having a diameter of 50 cm equipped with a temperature controller was arranged so that the film was in contact with the heating roll over ¾ circumference immediately before the film pass through the electrode zone, and further, the temperature of the film surface was adjusted to (Tg–50° C.) by bringing a thermocouple thermometer into contact with the film surface between the heating roll and the electrode zone.

The pressure within the vacuum tank was 0.2 Torr, and the partial pressure of $H_2O$ in the atmospheric gas was 75%. The discharge frequency was 30 KHz, and the throughput strength of each level was 3 kW. The vacuum glow discharge electrodes were prepared according to a method described in JP-A-7-3056. Before the support subjected to discharge treatment were wound, they were brought into contact with a cooling roll having a diameter of 50 cm equipped with a temperature controller.

(3) Formation of First Backing Layer (Electrically Conductive Layer):

230 parts by weight of stannic chloride and 23 parts by weight of antimony trichloride were dissolved in 3000 parts by weight of ethanol to prepare a homogeneous solution. An 1N aqueous solution of sodium hydroxide was added dropwise to the solution until the pH thereof reaches 3 to obtain a colloidal coprecipitate of stannic oxide and antimony oxide. The coprecipitate obtained was allowed to stand at 50° C. for 24 hours to obtain a reddish brown colloidal precipitate.

The colloidal precipitate was separated by centrifuging. The precipitate was mixed with water, and washed by centrifuging to exclude the excess ions. This operation was repeated three times.

200 parts by weight of the resulting colloidal precipitate was dispersed again in 1500 parts by weight of water, and the resulting dispersion was sprayed into a calcining furnace to obtain fine particles of a bluish stannic oxide/antimony oxide complex having an average diameter of 0.005 μm. The fine particles had a resistivity of 25 Ωcm.

A mixture of 40 parts by weight of the above fine particles and 60 parts by weight of water was adjusted to pH 7.0, coarsely dispersed with a stirrer, and then dispersed with a horizontal sand mill (Dynomill, manufactured by Willy A. Backfen AG) until the retention time becomes 30 minutes to prepare a dispersion in which part of primary particles were aggregated into secondary particles having a diameter of 0.05 μm.

A solution having the following formulation was applied to the support so as to give a dry thickness of 0.3 μm, and dried at 110° C. for 30 seconds.

| | |
|---|---|
| Dispersion of the above Electrically Conductive Fine Particles ($SnO_2/Sb_2O_2$, 0.15 μm) | 100 parts by weight |
| Gelatin (Lime-Treated Gelatin containing 100 ppm of $Ca^{++}$) | 10 parts by weight |
| Water | 270 parts by weight |
| Methanol | 600 parts by weight |
| Resorcin | 20 parts by weight |
| Nonionic Surfactant (Nonionic Surfactant I-13 described in JP-B-3-27099) | 0.1 part by weight |

(4) Heat Treatment (BTA Treatment) of Support:

After finishing the surface treatment and the formation of the first backing layer, the support was heated by allowing them to pass through a zone maintained at temperatures 5° C. lower than glass transition temperatures (Tg) thereof, rolled up in a rolling chamber maintained at (Tg–5° C.), and then placed in a thermostatic chamber set at temperatures of (Tg–5° C.) for 48 hours to carry out heat treatment. The support was wound, in all cases, round a winding core with the surface for forming the backing layer turned inward. The winding conditions are as follows:

Winding Core: A hollow aluminum winding core having a diameter of 300 mm and a length of 1500 mm.

Support: 1200 mm in width and 2000 meters in length.

Winding Tension: Winding Core Side: 15 kg/meter, Outer Side of Roll: 10 kg/meter.

After the BTA treatment, the roll of the support was cooled to room temperature, and unwound (Tension: 15 kg/meter, Transporting Speed: 5 meters/minute), and the support 100 m apart from the winding core was evaluated in terms of flatness. The evaluation was performed with visual inspection, and lengths of winding distortion developed were recorded. The results are shown in Table 1.

(5) Formation of Undercoat Layer (Emulsion Layer Side):

The support subjected to the BTA treatment was coated with an undercoating solution having the following formulation by using a wire bar so that the coating amount became 10 ml/m², dried at 115° C. for 2 minutes, and then wound.

| | |
|---|---|
| Gelatin | 10.0 parts by weight |
| Water | 24.0 parts by weight |
| Methanol | 961.0 parts by weight |
| Salicylic Acid | 3.0 parts by weight |
| Polyamide-Epichlorohydrin Resin (described in JP-A-51-3619 (Synthesis Example 1)) | 0.5 part by weight |
| Nonionic Surfactant (Nonionic Surfactant I-13 described in JP-B-3-27099) | 0.1 part by weight |

(6) Formation of Second Backing Layer:

After conducting the surface treatment, formation of the undercoat layer and the first backing layer, the support was coated with a solution having the following formulation so as to be 1.2 μm in thickness of dried film. Drying was carried out at temperatures of (Tg–5° C.).

| | |
|---|---|
| Diacetyl Cellulose | 100 parts by weight |
| Trimethylolpropane-3-toluenediisocyanate | 25 parts by weight |
| Methyl Ethyl Ketone | 1050 parts by weight |
| Cyclohexanone | 1050 parts by weight |

(7) Formation of Third Backing Layer (Slippery Layer):

(7-1) Preparation of First Solution for Slippery Layer:

The following mixture was heated to 90° C. to make the first solution, added to the second solution described below, and then dispersed with a high-pressure homogenizer to prepare a stock dispersion for the slippery layer.

First Solution

| | |
|---|---|
| Slip Agent $C_6H_{13}CH(OH)(CH_2)_{10}COOC_{40}H_{81}$ | 0.7 g |
| Slip Agent $n\text{-}C_{17}H_{35}COOC_{40}H_{81-n}$ | 1.1 g |
| Xylene | 2.5 g |

(7-2) Preparation of Second Solution for Slippery Layer:

The following binders and solvents were added to the above described first solution for the slippery layer to prepare a coating solution.

| | |
|---|---|
| Propylene Glycol Monomethyl Ether | 34.0 g |
| Diacetyl Cellulose | 3.0 g |
| Acetone | 600.0 g |
| Cyclohexanone | 350.0 g |

(7-3) Formation of Slippery Layer:

The above described coating solution was applied to the outermost backing layer using a wire bar so as to be 10 cc/m² in coating amount.

(8) Preparation of Photosensitive Material:

Coating solutions having the following compositions were multilayer-coated to form the following layers on all the supports to prepare samples, multilayer color photosensitive materials.

(Compositions for Photosensitive Layers)

Main materials used for the photographic layers are classified into groups as described below.

| | |
|---|---|
| ExC: Cyan Coupler | |
| ExM: Magenta Coupler | |
| ExY: Yellow Coupler | |
| ExS: Sensitizing Dye | |
| UV: Ultraviolet Absorbing Agent | |
| HBS: High Boiling Organic Solvent | |
| H: Gelatin Hardener | |

The numerals corresponding to the respective components show coating amounts thereof represented by the unit of g/m², and the coating amounts of silver halide are indicated in terms of silver, with the proviso that the coating amounts of sensitizing dyes are shown by molar ratios thereof to silver halide in the same layer.

| First Layer (Antihalation Layer) | | |
|---|---|---|
| Black Colloidal Silver | Silver | 0.09 |
| Gelatin | | 1.60 |
| ExM-1 | | 0.12 |
| ExF-1 | | $2.0 \times 10^{-3}$ |
| Solid Disperse Dye ExF-2 | | 0.030 |
| Solid Disperse Dye ExF-3 | | 0.040 |
| HBS-1 | | 0.15 |
| HBS-2 | | 0.02 |
| Second Layer (Interlayer) | | |
| Silver Iodobromide Emulsion M | Silver | 0.065 |
| ExC-2 | | 0.04 |
| Polyethyl Acrylate Latex | | 0.20 |
| Gelatin | | 1.04 |
| Third Layer (Low Sensitivity Red Sensitive Emulsion Layer) | | |
| Silver Iodobromide Emulsion A | Silver | 0.25 |
| Silver Iodobromide Emulsion B | Silver | 0.25 |
| ExS-1 | | $6.9 \times 10^{-5}$ |
| ExS-2 | | $1.8 \times 10^{-5}$ |
| ExS-3 | | $3.1 \times 10^{-4}$ |
| ExC-1 | | 0.17 |
| ExC-3 | | 0.030 |
| ExC-4 | | 0.10 |
| ExC-5 | | 0.020 |
| ExC-6 | | 0.010 |
| Cpd-2 | | 0.025 |
| HBS-1 | | 0.10 |
| Gelatin | | 0.87 |
| Fourth Layer (Medium Sensitivity Red Sensitive Emulsion Layer) | | |
| Silver Iodobromide Emulsion C | Silver | 0.70 |
| ExS-1 | | $3.5 \times 10^{-4}$ |
| ExS-2 | | $1.6 \times 10^{-5}$ |
| ExS-3 | | $5.1 \times 10^{-4}$ |
| ExC-1 | | 0.13 |
| ExC-2 | | 0.060 |
| ExC-3 | | 0.0070 |
| ExC-4 | | 0.090 |
| ExC-5 | | 0.015 |
| ExC-6 | | 0.0070 |
| Cpd-2 | | 0.023 |
| HBS-1 | | 0.10 |
| Gelatin | | 0.75 |
| Fifth Layer (High Sensitivity Red Sensitive Emulsion Layer) | | |
| Silver Iodobromide Emulsion D | Silver | 1.40 |
| ExS-1 | | $2.4 \times 10^{-4}$ |
| ExS-2 | | $1.0 \times 10^{-4}$ |
| ExS-3 | | $3.4 \times 10^{-4}$ |
| ExC-1 | | 0.10 |
| ExC-3 | | 0.045 |
| ExC-6 | | 0.020 |
| ExC-7 | | 0.010 |
| Cpd-2 | | 0.050 |
| HBS-1 | | 0.22 |
| HBS-2 | | 0.050 |
| Gelatin | | 1.10 |
| Sixth Layer (Interlayer) | | |
| Cpd-1 | | 0.090 |
| Solid Disperse Dye ExF-4 | | 0.030 |
| HBS-1 | | 0.050 |
| Polyethylene Acrylate Latex | | 0.15 |
| Gelatin | | 1.10 |
| Seventh Layer (Low Sensitivity Green Sensitive Emulsion Layer): | | |
| Silver Iodobromide Emulsion E | Silver | 0.15 |
| Silver Iodobromide Emulsion F | Silver | 0.10 |
| Silver Iodobromide Emulsion G | Silver | 0.10 |
| ExS-4 | | $3.0 \times 10^{-4}$ |
| ExS-5 | | $2.1 \times 10^{-4}$ |
| ExS-6 | | $8.0 \times 10^{-4}$ |
| ExM-2 | | 0.33 |
| ExM-3 | | 0.086 |
| ExY-1 | | 0.015 |
| HBS-1 | | 0.30 |
| HBS-3 | | 0.010 |
| Gelatin | | 0.73 |
| Eighth Layer (Medium Sensitivity Green Sensitive Emulsion Layer): | | |
| Silver Iodobromide Emulsion H | Silver | 0.80 |
| ExS-4 | | $3.2 \times 10^{-5}$ |
| ExS-5 | | $2.2 \times 10^{-4}$ |
| ExS-6 | | $8.4 \times 10^{-4}$ |
| ExC-8 | | 0.010 |
| ExM-2 | | 0.10 |
| ExM-3 | | 0.025 |
| ExY-1 | | 0.018 |
| ExY-4 | | 0.010 |
| ExY-5 | | 0.040 |
| HBS-1 | | 0.13 |
| HBS-3 | | $4.0 \times 10^{-3}$ |
| Gelatin | | 0.80 |
| Ninth Layer (High Sensitivity Green Sensitive Emulsion Layer): | | |
| Silver Iodobromide Emulsion I | Silver | 1.25 |
| ExS-4 | | $3.7 \times 10^{-5}$ |
| ExS-5 | | $8.1 \times 10^{-5}$ |
| ExS-6 | | $3.2 \times 10^{-4}$ |
| ExC-1 | | 0.010 |

-continued

| | | |
|---|---|---|
| ExM-1 | | 0.020 |
| ExM-4 | | 0.025 |
| ExM-5 | | 0.040 |
| Cpd-3 | | 0.040 |
| HBS-1 | | 0.25 |
| Polyethyl Acrylate Latex | | 0.15 |
| Gelatin | | 1.33 |
| Tenth Layer (Yellow Filter Layer) | | |
| Yellow Colloidal Silver | Silver | 0.015 |
| Cpd-1 | | 0.16 |
| Solid Disperse Dye ExF-5 | | 0.060 |
| Solid Disperse Dye ExF-6 | | 0.060 |
| Oil-Soluble Dye ExF-7 | | 0.010 |
| HBS-1 | | 0.60 |
| Gelatin | | 0.60 |
| Eleventh Layer (Low Sensitivity Blue Sensitive Emulsion Layer): | | |
| Silver Iodobromide Emulsion J | Silver | 0.09 |
| Silver Iodobromide Emulsion K | Silver | 0.09 |
| ExS-7 | | $8.6 \times 10^{-4}$ |
| ExC-8 | | $7.0 \times 10^{-3}$ |
| ExY-1 | | 0.050 |
| ExY-2 | | 0.22 |
| ExY-3 | | 0.50 |
| ExY-4 | | 0.020 |
| Cpd-2 | | 0.10 |
| Cpd-3 | | $4.0 \times 10^{-3}$ |
| HBS-1 | | 0.28 |
| Gelatin | | 1.20 |
| Twelfth Layer (High Sensitivity Blue Sensitive Emulsion Layer): | | |
| Silver Iodobromide Emulsion L | Silver | 1.00 |
| ExS-7 | | $4.0 \times 10^{-4}$ |
| ExY-2 | | 0.10 |
| ExY-3 | | 0.10 |
| ExY-4 | | 0.010 |
| Cpd-2 | | 0.10 |
| Cpd-3 | | $1.0 \times 10^{-3}$ |
| HBS-1 | | 0.070 |
| Gelatin | | 0.70 |
| Thirteenth Layer (First Protective Layer) | | |
| UV-1 | | 0.19 |
| UV-2 | | 0.075 |
| UV-3 | | 0.065 |
| ExF-8 | | 0.045 |
| ExF-9 | | 0.050 |
| HBS-1 | | $5.0 \times 10^{-2}$ |
| HBS-4 | | $5.0 \times 10^{-2}$ |
| Gelatin | | 1.8 |
| Fourteenth Layer (Second Protective Layer) | | |
| Silver Iodobromide Emulsion M | Silver | 0.10 |
| H-1 | | 0.40 |
| B-1 (Diameter 1.7 $\mu$m) | | $5.0 \times 10^{-2}$ |
| B-2 (Diameter 1.7 $\mu$m) | | 0.15 |
| B-3 | | 0.05 |
| S-1 | | 0.20 |
| Gelatin | | 0.70 |

Further, in order to improve storability, processability, resistance to pressure, antifungal and antimicrobial properties, antistatic properties, and coating properties, W-1 to W-3, B-4 to B-6, F-1 to F-17, iron salts, lead salts, gold salts, platinum salts, palladium salts, iridium salts, and rhodium salts were appropriately added to the respective layers.

(A) Emulsions J to L were subjected to reductive sensitization using thiourea dioxide and thiosulfonic acid upon preparing the grains, according to the Examples of JP-A-2-191938.

(B) Emulsions A to I were subjected to gold sensitization, sulfur sensitization and selenium sensitization in the presence of sodium thiocyanate and spectral sensitizing dyes described in the respective photosensitive layers, according to the Examples of JP-A-3-237450.

(C) For preparing tabular grains, low-molecular gelatin was used according to the Examples of JP-A-1-158426.

(D) In the tabular grains, dislocation lines as described in JP-A-3-237450 were observed under a high-pressure electron microscope.

(E) Emulsion L are double structure grains containing internally high iodine cores as described in JP-A-60-143331.

Preparation of Dispersion of Organic Solid Disperse Dye:

ExF-2 shown below was dispersed according to following procedure. That is, 21.7 ml of water, 3 ml of a 5% aqueous solution of sodium p-octylphenoxyethoxyethoxyethane-sulfonate, and 0.5 g of a 5% aqueous solution of p-octylphenoxypolyoxyethylene ether (polymerization degree: 10) were placed in a 700-ml pot mill, and 5.0 g of dye ExF-2 and 500 ml of zirconium oxide beads (diameter 1 mm) were added to the mixture. The contents were dispersed for two hours using a model BO vibration ball mill manufactured by Chuo Koki K.K., Ltd. Thereafter, the contents were taken out from the mill, and added to 8 g of a 12.5% aqueous solution of gelatin. The beads were separated by filtration to obtain a gelatin dispersion of the dye. Fine particles of the dye had an average particle size of 0.44 $\mu$m.

Similarly, solid dispersions of ExF-3, ExF-4 and ExF-6 were obtained. Average particle sizes of the fine particles were 0.24 $\mu$m, 0.45 $\mu$m, and 0.52 $\mu$m, respectively. ExF-5 was dispersed according to a microprecipitation dispersing process as described in Example 1 of European Patent Publication No. 549,489A. The average particle size thereof was 0.06 $\mu$m.

ExC-1

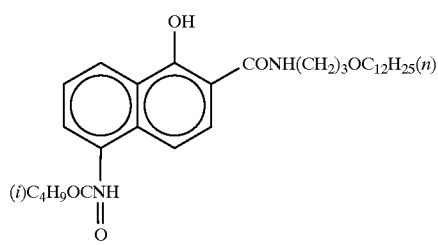

-continued
ExC-2
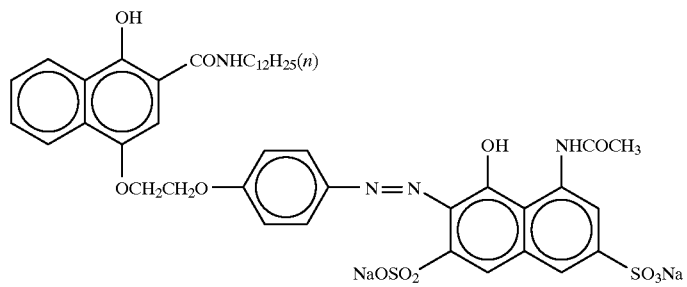
ExC-3
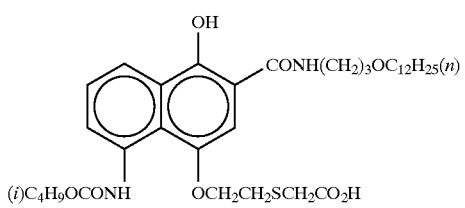
ExC-4
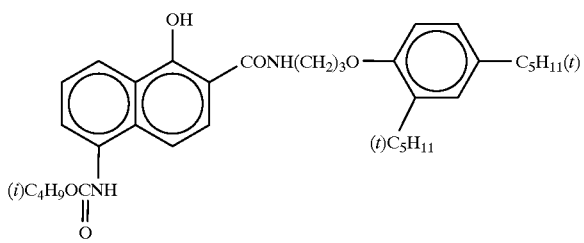
ExC-5
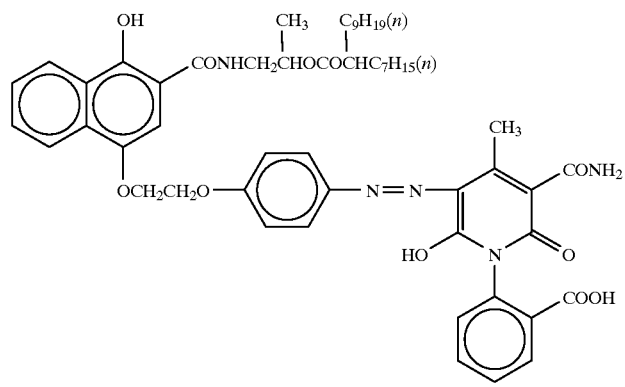
ExC-6
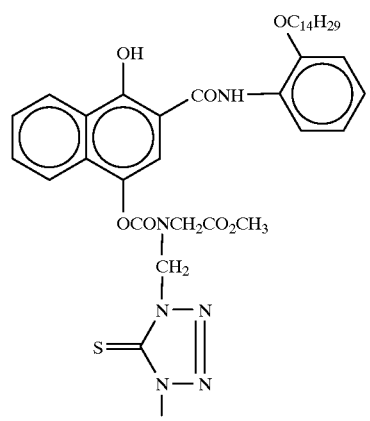

In the polyester supports in which a difference in orientation angle between both the side edges and the center thereof is adjusted to 0° to 40° by performing the present invention, winding distortion developing after the heat treatment (BTA treatment) can be markedly reduced, whereby photographic films exhibiting excellent flatness and a process for manufacturing the films can be provided.

While the invention has been described in detail and with reference to specific examples thereof, it will be apparent to one skilled in the art that various changes and modifications can be made therein without departing from the spirit and scope thereof.

What is claimed is:

1. A polyester support which is biaxially oriented at least in the longitudinal direction and in the transverse direction and is subjected to heat-setting and which has side edge portions and a center portion, wherein said polyester support has a width of 1 meter or more and comprises a polyester comprising polyethylene naphthalate as a main component, having a 2,6-naphthalene dicarboxylic acid content in the whole dicarboxylic acid residues of not less than 50 mol %, and wherein the difference between the orientation angle of the main axes of the polyester molecules in the side edge portions and that in the center portion is from 0° to 40°.

2. The polyester support according to claim 1, wherein said difference in orientation angle is from 0° to 25°.

3. The polyester support according to claim 2, wherein said difference in orientation angle is from 0° to 15°.

4. The polyester support according to claim 1, wherein said polyester comprises polyethylene 2,6-naphthalate.

5. A process for manufacturing a polyester support comprising the steps of:

forming a polyester film; and slitting the formed polyester film in the lengthwise direction thereof into 2 to 30 strips, to thereby provide polyester supports, wherein each support is biaxially oriented at least in the longitudinal direction and in the transverse direction and is subjected to heat-setting and which has side edge portions and a center portion, wherein each said polyester support has a width of 1 meter or more and comprises a polyester comprising polyethylene naphthalate as a main component, having a 2,6-naphthalene dicarboxylic acid content in the whole dicarboxylic acid residues of not less than 50 mol %, and wherein the difference between the orientation angle of the main axes of the polyester molecules in the side edge portions and that in the center portion is from 0° to 40°, wherein the polyester-film-forming step comprises bi- or more axially stretching an unstretched polyester film having side edge portions which are thickened by from 0.1% to 10% of the average thickness thereof.

6. The process according to claim 5, wherein the side edge portions are thickened in the polyester-film-forming step by from 0.3% to 3% of the average thickness thereof.

7. The process according to claim 5, wherein the unstretched polyester film further has from 2 to 30 band-shaped thickened portions which are aligned along the lengthwise direction thereof.

8. The process according to claim 7, wherein the band-shaped thickened portions are 0.2% to 5% thicker than the average thickness of the unstretched film.

9. The process according to claim 7, wherein the band-shaped thickened portions are 0.1% to 10% thicker than the average thickness of the unstretched film.

10. The process according to claim 9, wherein the band-shaped thickened portions are 0.3% to 3% thicker than the average thickness of the unstretched film.

11. The process according to claim 5, wherein said polyester comprises polyethylene 2,6-naphthalate.

12. The process according to claim 5, wherein the side edge portions are 0.2% to 5% thicker than the average thickness of the unstretched film.

13. The process according to claim 5, further comprising heat treating the strips.

14. A silver halide photographic film which comprises a polyester support having coated, on at least one side thereof, at least one silver halide photographic photosensitive layer, wherein said polyester support is biaxially oriented at least in the longitudinal direction and in the transverse direction and is subjected to heat-setting and which has side edge portions and a center portion, wherein said polyester support has a width of 1 meter or more and comprises a polyester comprising polyethylene naphthalate as a main component, having a 2,6-naphthalene dicarboxylic acid content in the whole dicarboxylic acid residues of not less than 50 mol %, and wherein the difference between the orientation angle of the main axes of the polyester molecules in the side edge portions and that in the center portion is from 0° to 40°.

15. The silver halide photographic film according to claim 14, wherein the polyester support is a heat-treated support, the heat-treatment being conducted, prior to coating thereon the silver halide photographic photosensitive layer, at a temperature of from 50° C. to the glass transition temperature (Tg) of the support.

16. The silver halide photographic film according to claim 15, wherein said polyester comprises polyethylene 2,6-naphthalate.

17. A silver halide photographic film which comprises a polyester support having coated, on at least one side thereof, at least one silver halide photographic photosensitive layer, wherein said polyester support is biaxially oriented at least in the longitudinal direction and in the transverse direction and is subjected to heat-setting and which has side edge portions and a center portion, wherein said polyester support has a width of 1 meter or more and comprises a polyester comprising polyethylene naphthalate as a main component, having a 2,6-naphthalene dicarboxylic acid content in the whole dicarboxylic acid residues of not less than 50 mol %, and wherein the difference between the orientation angle of the main axes of the polyester molecules in the side edge portions and that in the center portion is from 0° to 40°, wherein the polyester support is a heat-treated support, the heat-treatment being conducted, prior to coating thereon the silver halide photographic photosensitive layer, at a temperature of from 50° C. to the glass transition temperature (Tg) of the support.

18. A process for manufacturing a silver halide photographic film, which comprises the steps of:

manufacturing a polyester support by a process comprising:

forming a polyester film;

slitting the formed polyester film in the lengthwise direction thereof into 2 to 30 strips, to thereby provide polyester supports, wherein each support is biaxially oriented at least in the longitudinal direction and in the transverse direction and is subjected to heat-setting and which has side edge portions and a center portion, wherein each said polyester support has a width of 1 meter or more and comprises a polyester comprising polyethylene naphthalate as a main component, having a 2,6-naphthalene dicarboxylic acid content in the whole dicarboxylic acid residues of not less than 50 mol %, and wherein the difference between the orientation angle of the main axes of the polyester molecules in the side edge portions and that in the center portion is from 0° to 40°, wherein the polyester-film-forming step comprises bi- or more axially stretching an unstretched polyester film having side edge portions which are thickened by from 0.1% to 10% of the average thickness thereof;

heat-treating the polyester support at a temperature of from 50° C. to the glass transition temperature (Tg) of the support; and coating a silver halide photographic photosensitive layer on the heat-treated polyester support, wherein the polyester support has side edge portions and a center portion, wherein the difference between the orientation angle in the side edge portions and that in the center portion is from 0° to 40°.

* * * * *